UNITED STATES PATENT OFFICE.

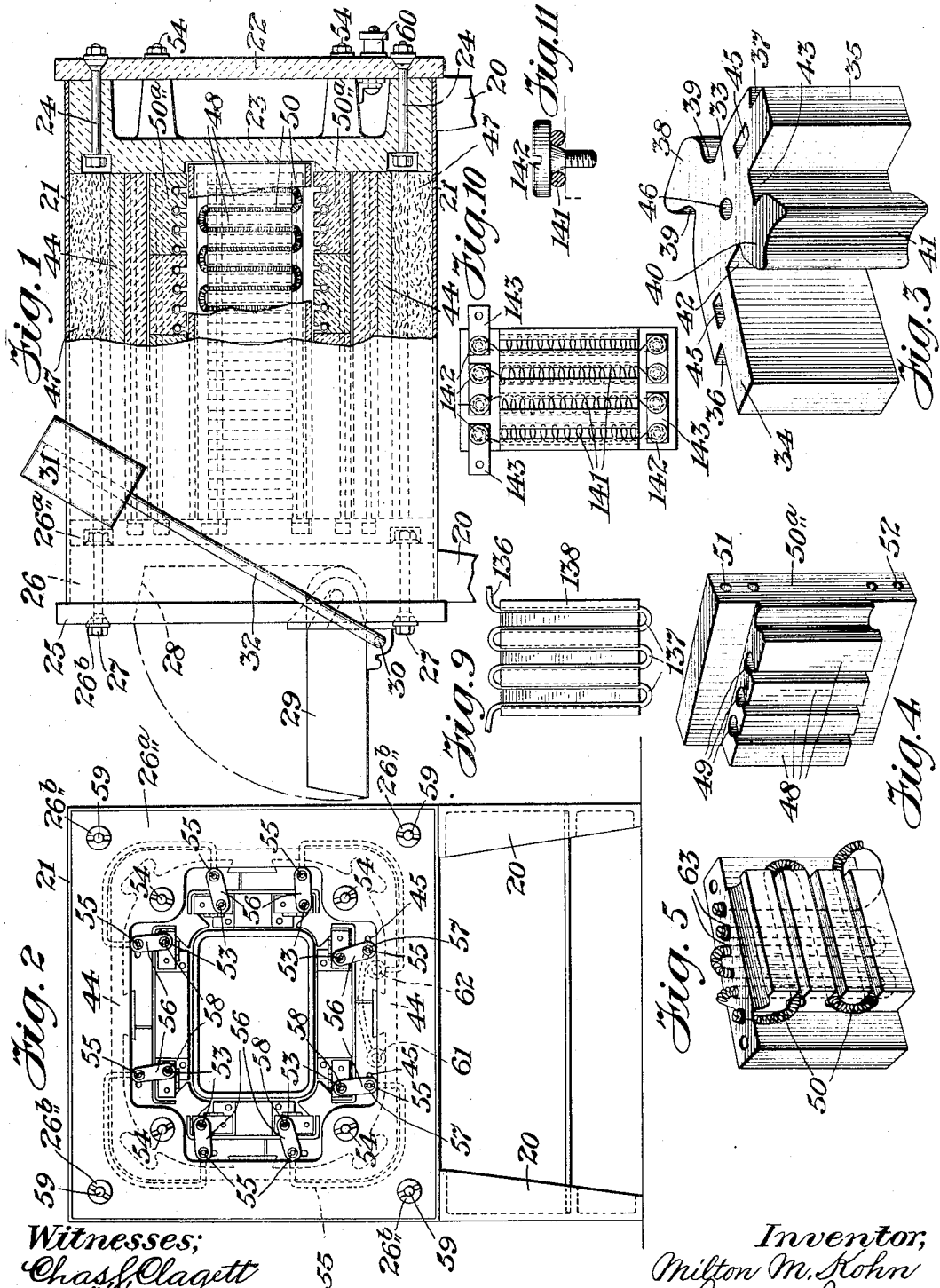

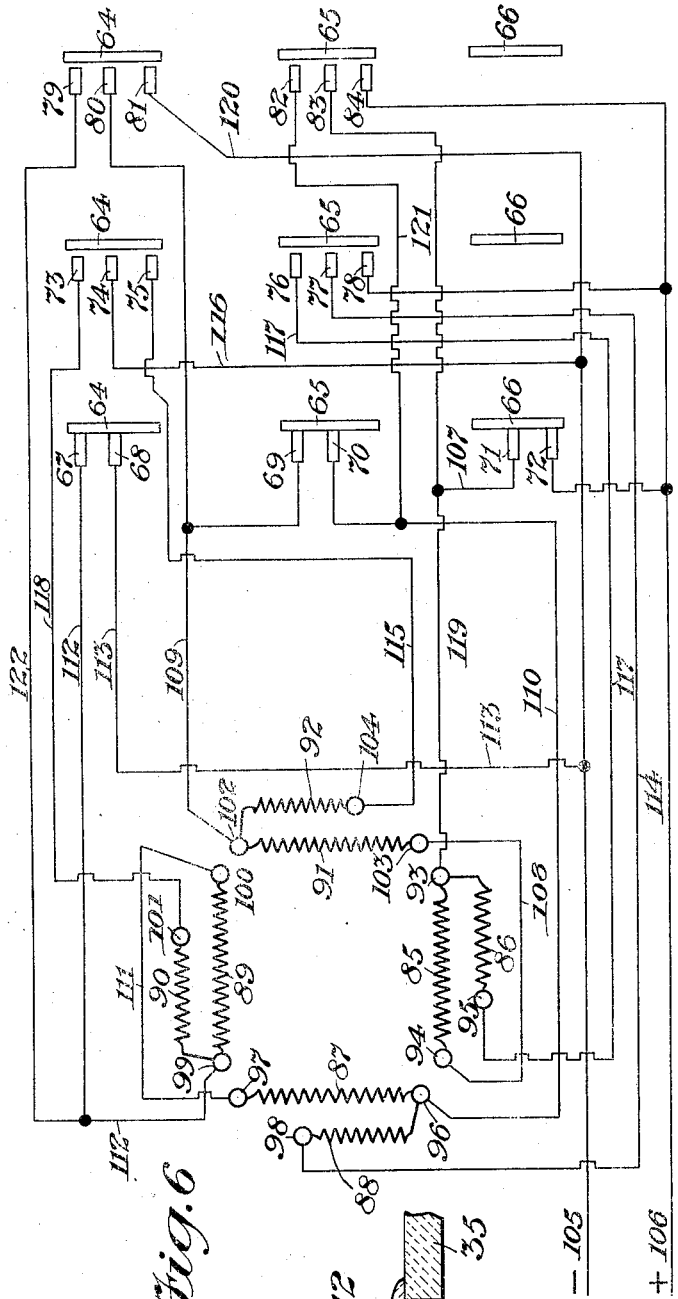

MILTON M. KOHN, OF NEW YORK, N. Y.

ELECTRIC HEATER.

1,057,745.     Specification of Letters Patent.     Patented Apr. 1, 1913.

Application filed February 5, 1912. Serial No. 675,568.

*To all whom it may concern:*

Be it known that I, MILTON M. KOHN, a citizen of the United States, residing in the borough of Manhattan, city, county, and State of New York, have invented an Improvement in Electric Heaters, of which the following is a specification.

This invention relates to electric heaters, and the electric heaters made in accordance therewith comprise a base, a housing or casing and a plurality of heating units; the objects of the invention being to so construct and unite these parts that the base and housing are a fixed or permanently united structure, adapted to receive the plurality of heating units therein in such a manner that the latter are independent the one of the other, so that each heating unit may be removed from the housing for renewal or repairs, or other purposes, without disturbing any of the other heating units; to provide each heating unit with a heating medium so placed therein as to be protected from the atmosphere so as to prevent unduly rapid deterioration, oxidization and from being misplaced or broken in use; to so connect the heating mediums of the several heating units that the said heating mediums may be employed in series or in multiple, or in combinations thereof, and with or without resistance either self-contained in the units themselves, or exteriorly in the heater casing, or entirely separate from it, in order to vary the resultant temperature obtained from a given energy; and also to obtain a uniform degree of heat throughout the heater at any of the temperatures produced therein and to so place the heating mediums within the heating units that the heat may be regulated and controlled entirely within the heater itself instead of being controlled exteriorly thereof.

The present invention is an improvement on the electric furnace shown and described in Letters Patent No. 983291, granted to me February 7th, 1911.

In the drawing, Figure 1 is a side elevation and partial cross section of one form of my improved electric heater. Fig. 2 is a front elevation of the same showing the head removed. Fig. 3 is a perspective view of one of the members forming the shell of the furnace shown in Figs. 1 and 2. Fig. 4 is a perspective view showing one of the blocks forming part of the heating element employed in this type of furnace. Fig. 5 is a view similar to Fig. 4, showing a modified form of the heating units. Fig. 6 is a diagrammatic view showing the heating mediums and a three-heat switch employed to control the current passing through the same in the use of the heating units as illustrated in Fig. 5. Fig. 7 is a plan of a modified form of heating unit which may be employed in my improved furnace. Fig. 8 is a view similar to Fig. 7, showing a further modification of a heating unit; Fig. 9 is an elevation of a heating unit in connection with which there is shown employed a heating medium made of a continuous length of relatively heavy resistance material. Fig. 10 is an elevation of the heating unit in which a separate resistance coil is used in each of the recesses. Fig. 11 is an elevation of the binding screw, and Fig. 12 is a partial cross section through the side of the housing, illustrating the employment of a spacer block.

Referring to Figs. 1 to 4 inclusive, wherein I have illustrated a heater of the muffle-type, in which my invention may be employed, 20 designates the supports or legs on which the heater structure is mounted. 21 designates a casing made of sheet metal or other suitable material and which is preferably rectangular in cross-section and opened.

At the right end of the heater, as shown in Fig. 1, or the rear thereof, I employ a head 22 and a clay baffle-plate 23 adapted to enter the end of the casing 21 and to be secured to the head 22 by means of bolts 24 or otherwise, and when in position, the inner surface of the head 22 abuts against the adjacent edge of the casing 21. Similarly at the opposite end of the casing 21, or the front of the heater, I employ a head 25 and a clay baffle plate 26, which is connected to the head 25 by bolts 27 or otherwise; the baffle plate 26 fitting within this end of the casing 21, so that when in position, the inner face of the head 25 abuts against the adjacent edge of the casing; between the baffle plate 26 and the front end of the heater shell (hereinafter described), I employ a filler plate 26ª whose function is to act as a head for the clay housing of the heater shell and also to keep the heat insulating material in position, as hereinafter described.

In the head 25 and the baffle plate 26 and filler plate 26ª there is an opening 28, by which access may be had to the interior of the heater, and I provide a door 29 by which this opening may be closed. The door 29 may be conveniently hinged at the point 30 and provided with a weight 31 connected to the head by an arm 32 acting on the door and by means of which the door may be maintained in either its closed or open position, as will be readily understood. This door is lined with a plate of non-heat conducting material and in order to maintain the heat within the heater and to prevent the door becoming unduly heated.

Within the casing 21 and between the filler plate 26ª and the baffle plate 23 therein, I employ a heater shell or housing. This heater shell is preferably made of a good non-heat conducting material such for instance as fire clay and is built up of a plurality of similar units or sections, one of which is shown in Fig. 3. Each section of this heater shell, as shown in Fig. 3, comprises an angular member 33, one arm 34 of which is longer than the other arm 35 thereof. The end portions of both of these arms 34 and 35 at an appreciable distance from their extremities, are reduced in width and at the line of reduction in their widths there are provided undercut recesses 36 and 37. In the corner portions of each of these heater shell units there is an external rib 38, in the sides of which there are recesses 39. Interiorly the corner portions of each of these heater shell units are provided with a rib 40, the inner surface of which is preferably concave as indicated at 41, and on either side of the rib 40 there are formed between the same and the adjacent portions of the arms 34 and 35, guide-ways 42 and 43 for the reception of the edges of the heating units. The concave corners 41 are so constructed as to receive and support a muffle, whether rectangular as shown in Figs. 1 and 2, or other shape, when it is necessary or desirable to use the same. Each of the heater shell units as shown in Fig. 3, is provided with rectangular bores 45 in the arm sections thereof, and a circular bore 46 in the corner thereof.

As will be readily understood, in forming the heater shell, four of the units or parts as shown in Fig. 3 are necessary to constitute one section of the shell; these four parts being placed together so that the end surface of the long arm 34 of one of these units abuts against the end surface of the short arm 35 of the next adjacent member. As will also be understood, as many of these sections, so constructed may be superposed or placed side by side, and secured together, as is necessary to build the heater shell.

After the sections of each layer have been placed in position, the corner sections of each member are secured together by tie-bars 54 passed through the bores 46 in the corners of each of the sections. When the desired number of sections have been so connected, the same are united by means of a suitable plaster material or covering 44 which surrounds the entire exterior of the shell to a sufficient thickness to bind the parts together into a unitary mass, it being understood that the plaster covering 44 enters the recesses 39 and also the recesses 36 and 37 so as to strengthen the structure, the ribs 38 being provided not only for this purpose, but the same, together with the ribs 40, to increase the material and consequently the strength of the heater shell at the corners where the same is most likely to crack.

It is well known that a hollow clay structure, particularly of considerable length and thin section when subjected to heat strains, is liable to crack in the thinnest portions, and the object of constructing the heater shell or housing as hereinbefore described, is to overcome this difficulty, and this is accomplished by the sectional construction which permits the shell to expand and contract so as to prevent its cracking, and this construction also permits of making odd shapes at a minimum cost.

It will be observed that in making the heater shell or housing of the blocks shown in Fig. 3, that a shell of predetermined cross section is obtained, but it will be also apparent that by employing a distance piece 139, as shown in Fig. 12, between the long arm 34 of one block and the short arm 35 of the next block, on all four sides, a shell of any desired cross section may be obtained.

As shown in Fig. 1, the heater shell section or housing, as hereinbefore described, runs between the filler plate 26ª and the baffle plate 23 and assumes a central position in the casing and between the exterior of the heater shell section and the inner surface of the casing, I employ a filling 47 of non-heat conducting material, such for example, as asbestos fiber. I also employ a plurality of heating units 50ª one of which is shown in Fig. 4. These heating units are adapted to be employed singly or placed in alinement with one another so as to form a heating unit of any desired length to be employed in a furnace in any required capacity. The inner surface of each heating unit is provided with series of ribs 48 between which there are undercut recesses 49 and within these recesses a heating medium 50, being preferably a coiled resistance wire is threaded.

Each of the heating unit sections 50ª as shown in Fig. 4, is provided with bores 51, 52, through which conducting tie-bars 53 are passed to secure the desired number of heating unit sections together to form one of the heating units, and also to carry the electric current, the ends of the heating mediums 50 being connected to these bars 53.

It will be understood that the heating unit sections may be made of suitable widths for use in furnaces of different cross-sections.

In Fig. 4 I have illustrated four bores 51, 52, and four or more of these may be employed as will be found necessary. For example, when the heating units are exceptionally large, it may be necessary to employ additional tie-rods, which are then passed through one or more sets of these bores, or again, under certain electrical conditions, it may be necessary to employ a tie-rod having a greater conductivity than could be obtained from the use of a single pair of bars, in which instance, as will be understood, one or more pairs may be employed. There are various other reasons for providing a multiplicity of bores in the blocks, as indicated in Fig. 4. Each of these heating units is adapted to be received in and to be removable from the inner shell independently of the other heating units, and as will be understood, this condition exists whether the heating units are each composed of one or more blocks. It will also be understood that when the filling blocks are employed to increase the cross section of the housing, similar or equivalent filling blocks may be employed to correspondingly increase the width of the heating units.

A tie-bar 54 is employed at each corner of the heater shell section. I also employ conductor bars 55, which pass through the bores 45, and at the inner end of each heater section, these bars 55 are looped over the outer surface of the corner of the heater shell, as indicated at 55ª and at the front end of the heater, each conductor bar 55 is provided with a conductor plate 56 to which the same is connected by a binding screw 57, and each conductor plate 56 is connected to the end of a heating medium 50 by means of a binding screw 58, and as will be understood, these connections are so made that each conductor bar 55 connects one end of the heating medium of one heating unit with one end of the heating medium in the next adjacent unit.

The heads 22 and 25 may be secured in position relatively to the housing by means of the tie-bolts 59 or otherwise, and the front ends of the tie-bolts 59 are screw-threaded for an appreciable distance so that the nuts 26ᵇ may be turned down therein against the filler plate 26ª to secure the same in position. The head 22 is provided with binding posts 60 which are connected electrically to the posts 61 and 62 in such a manner that the coils forming the heating mediums in the several sections may be connected in series, or the coils in opposite sections connected in multiple, as described in my patent aforesaid.

Referring to Fig. 5, it will be seen that I may also provide the heating units as employed in Figs. 1 and 2, with additional bores 63 through which a length of heating medium is passed after having been threaded through the recesses between the ribs on its inner surface and that portion of the heating medium which passes through these additional bores may be employed as an auxiliary heat coil and resistance in the control of the heat generated in the heater, as will be hereinafter described.

Whether units with or without the auxiliary resistance coils are employed, as will be noted, the heat control is regulated entirely within the heater itself and as will also be apparent, the distribution of the heat within the heater at any of the possible temperatures, will be absolutely uniform in all portions of the heater, because in all variations of the heat control, the entire length of the heating mediums is employed for effecting each of the different temperatures. For example, the form of heater shown in Figs. 1 and 2 may be fitted with heating units,— one section of which is illustrated in Fig. 5, so as to provide a three temperature furnace. The first or low heat temperature being produced by placing the heating medium of the several heat units in series with one another, with the internal or auxiliary or resistance coils cut out. The second or intermediate heat or temperature may be produced by placing the heating mediums and their respective internal heat or resistance coils in opposite pairs of heating units in multiple with each other, and the third or maximum heat is produced by placing the heating mediums of opposite pairs of heat units in multiple, with the internal resistance or auxiliary heat coils cut out. To effect this heat control, I employ a revoluble switch which is shown diagrammatically in Fig. 6, and comprises three conductor bar sections on a revoluble member so as to be brought into contact with any one of the three sets of contact points. These contact bars are indicated respectively at 64, 65, and 66, and in the first set of contact points there are contacts 67, 68, 69, and 70, and 71 and 72. In the second set of contact points there are the contacts 73, 74 and 75, and 76, 77 and 78, and in the third set of contact points there are contacts 79, 80 and 81, and 82, 83, and 84.

85 represents diagrammatically the heating medium of one of the heat units of the heater, and 86 the internal resistance coil thereof; 87 the heating medium of the next adjacent heating unit of the heater and 88 its internal resistance coil.

89 represents the heating medium of the third heating unit of the heater, and 90 its internal resistance coil.

91 represents the heating medium of the fourth heating unit and 92 its internal resistance coil.

93, 94, and 95 are the respective binding posts for the terminals of the heating medium and its resistance coil in the first heating unit.

96, 97 and 98 are similar binding posts of the second heating unit.

99, 100 and 101 are the corresponding binding posts of the third heating unit, and 102, 103 and 104 the corresponding binding posts of the fourth heating unit.

105, 106, represent the line wires.

Now in the first position, as hereinbefore described, and that in which the several heating mediums are placed in series to produce the low heat, the contact bars 64, 65, 66, are so placed as to come respectively in contact with the contact points 67, and 68, 69 and 70, and 71 and 72. Assuming that the line 106 is the positive line and 105 the negative line, it will be apparent that the current passes by way of the line 106 to the contact point 72, the bar 66, contact point 71, wire 107 to the binding-post 93, through the heating medium 85, post 94, wire 108, post 103, heating medium 91, post 102, wire 109, to the contact point 69, bar 65, contact point 70, wire 110, post 96, heating medium 87, post 97, wire 111, post 100, heating medium 89, post 99, wire 112, contact point 67, bar 64 contact point 68, wire 113, to the negative lead 105.

In the second position of the contact bars of the switch, the intermediate heat is produced by placing the heating mediums of opposite pairs of heating units in multiple with the internal coils in each unit in series with its heating medium, and the bars 64, 65, 66, are placed in such a position that the bar 64 contacts with the points 73, 74, and 75, and the bar 65 with the contact points 76, 77 and 78, the contact bar 66 being unemployed. In this position, the current passes by way of the lead wire 106 to the contact point 78 to the bar 65 where it divides; part of the current passing by way of the contact point 76, wire 117 to the post 95, internal resistance coil 86, post 93 to the heating medium 85 to post 94 by the wire 108 to post 103 through the heating medium 91, post 102, through the internal resistance 92, post 104, thence by wire 115 to the contact points 75 to the bar 64; thence by wire 116 to the negative lead wire 105; the other portion of the current passing by way of the contact point 77, wire 114, post 98, internal resistance coil 88, post 96, heating medium 87, post 97, wire 111, post 100, heating medium 89, post 99, internal resistance coil 90, post 101, wire 118 to the contact point 73 and bar 64; thence by way of the wire 116 to the negative lead wire 105.

In the third position of the switch in which the maximum heat is produced, wherein the heating mediums of the pairs of heating units are parallel and the resistance coils cut out, the bars 64, 65, are so placed that the bar 64 contacts with the points 79, 80 and 81, and the bar 65 with the contact points 82, 83, and 84, and the bar 66 as in the foregoing position, is not brought into contact with any of the contact points. In this position as is obvious, the current passes by way of the line wire 106 to the contact point 84, bar 65, where it will divide; part of the current passing by way of the wire 119 to the post 93, heating medium 85, post 94, wire 108, heating medium 91, post 102, wire 109 to contact point 80, bar 64, contact point 81 and wire 120 to the negative lead wire 105; the other part of the current passing by way of the contact point 82, wire 121, wire 110, post 96, heating medium 87, post 97, wire 111, post 100, heating medium 89, post 99, wire 112, and wire 122, contact point 79, bar 64, and thence by way of contact point 81 and the wire 120 to the negative wire 105.

While I have hereinbefore shown and described heaters in which a two and a three heat control are obtained, it will be understood that I do not limit myself to these heat controls, as it is obvious that as many different heat controls as may be desired, can be employed on the same principles, without departing from the nature of my invention.

Referring to Fig. 7, it will be seen that instead of employing the form of heat unit shown in Fig. 4, I may employ a plurality of blocks 123, each of materially smaller width than the width of the blocks 124. Each of these blocks on the side being innermost when placed in the furnace, is of reduced width as indicated at 124, and at a point adjacent to this innermost surface on both sides of each of these blocks, the same is provided with a recess 125. Each of these blocks 123 is provided with a transverse bore 126, and it will be understood that when placed in position, any desired number of these blocks may be securely connected together by a rod and suitable clamp nuts to make a unit of any required length. In the block so formed, the section of reduced width provides for an opening 127 communicating between the heating chamber of the furnace and the substantially circular space 128 provided by the recesses 125, in which spaces as will be understood, the heating medium either in the form of a continuous spiral wire is contained as hereinbefore described, or separate and individual sections of relatively heavy wire, as shown at 129 in Fig. 7.

Now referring to Fig. 8, the heating unit blocks instead of being formed as shown in Fig. 4, may be constructed without the ribs 48 on their outer surfaces. Such a block in Fig. 8 is indicated at 130. In this construction the innermost face of the block 130 or that forming the lining of the heating chamber of the furnace, is provided with series of grooves or recesses indicated at 131. In this form of heating unit, I employ a separate or individual block for receiving the coils of the heating medium, which blocks are indicated at 132 and each of which is provided with a rib 133 adapted to be received and fit within one of the grooves 131 in the block 130, and also with an undercut recess 134 adapted to receive the heating medium coils 135. As also shown in this figure, the blocks 132 may be divided centrally and longitudinally so that in the use of the heating medium which is relatively heavy and consequently is shaped with more or less difficulty, the halves of the block may be fitted over the coils of the heating medium and then the blocks containing the heating medium placed in position in the recesses 131.

Referring to Fig. 9, it will be seen that I may employ a heating medium made of relatively heavy resistance wire 136, formed with numerous loops 137, each of which is adapted to be contained within one of the recesses in the heating unit 138. Suitable terminals are provided in the respective ends of this heating medium in order that the same may be connected in the circuit in the same manner as the heating medium hereinafter described.

Referring to Fig. 10, it will be seen that I may employ a separate heating medium for each recess in the several heating units; this is particularly advantageous when the heating medium is made of relatively heavy resistance wire, at least an eighth of an inch in diameter. As shown in this figure, the several heating mediums are indicated at 141. The end of each heating medium is looped and adapted to be secured by means of a binding screw 142 or otherwise, to a contact plate 143 secured in the face of the heating unit, it being understood that the contact plates 143 are placed in staggered positions, so that a continuous circuit is formed by them and the heating mediums through each heating unit.

As shown in Fig. 11, the shank of the binding screw 142 adjacent to the head thereof, may be tapered so that when being turned down to position, this tapered portion of the shank of the screw, enters the loop at the end of the heating medium, slightly spreading the same and thereby making a more perfect contact than would otherwise be made.

It will also be understood that the heating units so constructed as to provide not only for the main resistance coils but also the auxiliary resistance coils, may be employed in connection with furnaces such as are shown and described in my Letters Patent to which reference has hereinbefore been made.

It will also be apparent that in employing the heating mediums in the manner hereinbefore described,—that is,—placing them in undercut recesses in the heating units communicating with the heating chamber, I am enabled to obtain a greater heat in this chamber than in those structures where the heating medium is wound on or placed in a wall through which the heat generated has to pass before reaching the heating chamber, and also I am enabled to dispense with the muffle, inasmuch as the inner portions of the walls of the heating units act as the equivalent of the muffle, excepting in certain chemical work where muffles must be used.

It is also within the scope of my invention to provide a crucible heater in which a crucible and separable and detachable heat unit may be provided with a suitable cover and employed as an integral structure.

I claim as my invention:

1. An electric furnace comprising a casing, a housing within the casing, and a plurality of heating units, each adapted to be placed within the housing and to be separately removable therefrom independently of one another, each heating unit comprising a plurality of blocks of refractory material secured together positively and in alinement, each heating unit being fitted with an independent heating medium.

2. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, and each heating unit being fitted with an independent heating medium, and means for connecting the heating mediums of the several heating units.

3. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, and each heating unit being fitted with an independent heating medium, means for connecting the heating mediums of the several heating units, and an auxiliary heating medium also fitted in each heating unit.

4. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, and each heating unit being fitted with an independent heating medium, means for connecting the heating mediums of the several heating units, an auxiliary heating medium also fitted in each heating unit, and means for connecting the heating mediums in an electric circuit with and without their respective auxiliary heating mediums.

5. An electric heater comprising a casing, a housing built up of a plurality of sections, each of the said sections being made of a plurality of blocks of refractory material, means for securing the blocks of each section together, means for securing together the various sections to comprise the housing, a plurality of heating units, each adapted to be placed within the so formed housing, and to be separately and independently removable therefrom, and a heating medium associated with each heating unit.

6. An electric heater comprising a casing, a housing built up of a plurality of sections, each of the said sections being made of a plurality of blocks of refractory material, means for securing the blocks of each section together, means for securing together the various sections to comprise the housing, a plurality of heating units each adapted to be placed within the so formed housing and to be separately and independently removable therefrom, a heating medium associated with each heating unit, and means for connecting together the heating mediums in the several sections.

7. An electric furnace comprising a casing, a housing built up of a plurality of sections, each of the said sections being made of a plurality of blocks of refractory material, means for securing the blocks of each section together, means for securing together the various sections to comprise the housing, a plurality of heating units each adapted to be placed within the so formed housing and to be separately and independently removable therefrom, a main heating medium associated with each of the several heating units, an auxiliary heating medium also associated with each of the several heating units, and means for connecting the said heating mediums and auxiliary heating medium in an electric circuit.

8. An electric heater comprising a casing, a housing built up of a plurality of sections, each of the said sections being made of a plurality of blocks of refractory material, means for securing the blocks of each section together, means for securing together the various sections to comprise the housing, a plurality of heating units each adapted to be placed within the so formed housing and to be separately and independently removable therefrom, a main heating medium associated with each of the several heating units, an auxiliary heating medium also associated with each of the several heating units, and means for connecting the main heating mediums of the several heating units in an electric circuit with and without their respective auxiliary heating mediums.

9. An electric furnace comprising a casing, a housing within the casing, a plurality of blocks of refractory material, means for securing together a predetermined number of said blocks to form a heating unit, a plurality of heating units so formed and each adapted to be received and be separately and independently removable from the said housing, and a heating medium associated with each of the said heating units.

10. An electric furnace comprising a casing, a housing within the casing, a plurality of blocks of refractory material, means for securing together a predetermined number of said blocks to form a heating unit, a plurality of heating units so formed and each adapted to be received in and to be separately and independently removable from the said housing as in integral heating unit, a heating medium associated with each of the said heating units, terminals for the said heating mediums, and means for connecting the said heating mediums in an electric circuit to produce within the furnace various temperatures each of a uniform and constant heat.

11. An electric furnace comprising a casing, a housing within the casing, a plurality of blocks of refractory material, means for securing together a predetermined number of said blocks to form a heating unit, a plurality of heating units so formed and each adapted to be received in and to be separately and independently removable from the said housing as an integral heating unit, a resistance coil forming a heating medium within each of the said units, and a second resistance coil forming an auxiliary heating medium also within each of the heating units.

12. An electric furnace comprising a casing, a housing within the casing, a plurality of blocks of refractory material, means for securing together a predetermined number of said blocks to form a heating unit, a plurality of heating units so formed and each adapted to be received and be separately and independently removable from the said housing, a resistance coil forming a heating medium within each of the said heating units, and means for connecting the resistance coils in an electric circuit both with and without their auxiliary resistance coils to produce within the furnace various temperature each of a uniform and constant heat.

13. An electric furnace comprising a casing, a housing within the casing and comprising a plurality of sections, each section of the housing being built up of a plurality of blocks of refractory material, means for securing together a plurality of said blocks to form a section of the housing, means for securing the sections together to form the housing, a plurality of blocks of refractory material, each having a plurality of bores running therethrough, a projection or outstanding portion on each of the said blocks having a series of spaced ribs therein, conductor tie-bolts passing through the bores of a plurality of the said blocks to bind the same together to form a heating unit, there being a plurality of such heating units employed in the furnace and each adapted to be received and to be separately and independently removable from the housing at one end thereof, a resistance coil forming a heating medium threaded through the recesses in the faces of the blocks forming each of the heating units, and means for connecting the resistance coils of the several heating units in an electric circuit.

14. An electric furnace comprising a casing, a housing within the casing, the said housing comprising a plurality of sections, each section being built up of a plurality of blocks of refractory material, each block having portions extending at right angles to one another and being provided with a plurality of bores extending therethrough, and ribs at the corresponding interior and exterior corners, there being recesses provided in the opposite sides of the interior corner rib and between the same and the adjacent faces of those portions at right angles to one another, a tie-bar extending through the corresponding bores of a plurality of said blocks to secure the same together to form a section of the housing, conductor bars passing through corresponding bores of the said blocks, means for securing the said sections together to form the housing, a plurality of blocks of refractory material, each having a plurality of bores therein, ribs with intervening recesses on one face of each of the said blocks, tie-bars passing through a plurality of the last aforesaid blocks to secure the same together to form a heating unit, a number of which are employed in the furnace and each of which is adapted to be received in the said recesses formed between the interior rib of the housing sections and the faces of the adjacent angular portions and to be separately and independently removable therefrom, a resistance coil forming a heating medium threaded through the said recesses between the ribs on the heating units, and electrical connections between the said resistance coils and the contact tie-bars of both the housing and the heating units to complete an electric circuit through the heater.

15. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, each heating unit being fitted with an independent heating medium placed within the same and below the working surface thereof.

16. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, and each heating unit being fitted with an independent heating medium placed within the same and below the working surface thereof, and means for connecting the heating mediums of the several heating units.

17. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement and each heating unit being fitted with an independent heating medium placed within the same and below the working surface thereof, means for connecting the heating mediums of the several heating units, and an auxiliary heating medium also fitted in each heating unit.

18. An electric furnace comprising a casing, a housing within the casing, a plurality of heating units, each adapted to be placed within the housing and to be separately removable therefrom independently of one another, each heating unit comprising a plurality of blocks of refractory material secured together positively and in alinement, and each heating unit being fitted with an independent heating medium, placed within the same and below the working surface thereof, means for connecting the heating mediums of the several heating units, an auxiliary heating medium also fitted in each heating unit, and means for connecting the heating mediums in an electric circuit with and without their respective auxiliary heating mediums.

19. An electric furnace comprising a casing, a housing having a series of recesses extending longitudinally therein, a plurality of heating units, each being provided with a rib adapted to be received within a recess in the housing, and a heating medium within each heating unit, each heating unit forming a retainer and support for its heating medium within which the heating medium is free to expand and contract.

20. An electric furnace comprising a casing, a housing having series of recesses running longitudinally thereof, a plurality of heating units, each made in two parts and provided with ribs so that when the parts are combined each heating unit is adapted to be received in one of the longitudinal recesses of the housing, and a heating medium within each heating unit, each heating unit forming a retainer and support for its heating medium within which the heating medium is free to expand and contract.

Signed by me this 2d day of February, 1912.

MILTON M. KOHN.

Witnesses:
 GEO. T. PINCKNEY,
 ARTHUR H. SERRELL.